(12) United States Patent
Srinivasan et al.

(10) Patent No.: US 10,586,459 B2
(45) Date of Patent: Mar. 10, 2020

(54) SYSTEM AND METHOD TO FETCH AERONAUTICAL TELECOMMUNICATIONS NETWORK CENTER INFORMATION FROM NAVIGATIONAL CHARTS FOR AIRCRAFT COMMUNICATIONS

(71) Applicant: Honeywell International Inc., Morris Plains, NJ (US)

(72) Inventors: Divya Swarup Giriyappa Srinivasan, Bangalore (IN); John Azariah Rajadurai, Bangalore (IN); Aravind Basavalingarajaiah, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 15/470,092

(22) Filed: Mar. 27, 2017

(65) Prior Publication Data
US 2018/0276996 A1    Sep. 27, 2018

(51) Int. Cl.
*G08G 5/00* (2006.01)
*H04L 29/08* (2006.01)

(52) U.S. Cl.
CPC ......... *G08G 5/0013* (2013.01); *G08G 5/0021* (2013.01); *H04L 67/10* (2013.01); *H04L 67/12* (2013.01)

(58) Field of Classification Search
CPC .. G08G 5/0013; G08G 5/0021; G08G 5/0091; G08G 5/0052; G08G 5/0095; G08G 5/025; G08G 5/003
See application file for complete search history.

(56) References Cited

U.S. PATENT DOCUMENTS 9,257,049 B2    2/2016    Axtell et al.
2007/0129854 A1    6/2007    Sandell et al.
(Continued)

FOREIGN PATENT DOCUMENTS

| EP | 2284818 A2 | 2/2011 |
| EP | 2980773 A1 | 2/2016 |
| EP | 3038074 | 6/2016 |

OTHER PUBLICATIONS

European Patent Office, "Extended European Search Report from EP Application No. 18162996.5 dated Aug. 29, 2018", from Foreign Counterpart of U.S. Appl. No. 15/470,092, filed Aug. 29, 2018, pp. 1-8, Published in: EP.

(Continued)

*Primary Examiner* — Redhwan K Mawari
(74) *Attorney, Agent, or Firm* — Fogg & Powers LLC

(57) ABSTRACT

A system for aircraft communications comprises an avionics processing unit onboard an aircraft, and a computing platform onboard the aircraft and in operative communication with the avionics processing unit. The computing platform hosts at least one application and one or more aircraft navigational charts with Air Traffic Control (ATC) center identifying information. An aircraft data network is also in operative communication with the computing platform. The avionics processing unit is operative to receive an ATC center facility designator input by a user or from another onboard avionics system, and to transmit the ATC center facility designator to the computing platform. The application is operative to query the aircraft navigational charts based on the ATC center facility designator to obtain corresponding ATC center identifying information, and to send the corresponding ATC center identifying information to the avionics processing unit.

20 Claims, 3 Drawing Sheets

(56) References Cited

U.S. PATENT DOCUMENTS

2011/0133980 A1* 6/2011 Judd .................. G08G 5/0013
342/37
2014/0372018 A1 12/2014 Srinivasan et al.

OTHER PUBLICATIONS

ATC Database Records, ATN Address Information Database, Major version: 2, Minor version: 1, Part No. 69001585-402, p. 1, Publisher: Cart version 3.0.0.
AFSG Planning Group, EUR NSAP Address Registry, Apr. 26, 2016, pp. 1-40.

* cited by examiner

SYSTEM AND METHOD TO FETCH AERONAUTICAL TELECOMMUNICATIONS NETWORK CENTER INFORMATION FROM NAVIGATIONAL CHARTS FOR AIRCRAFT COMMUNICATIONS

BACKGROUND

Due to various aeronautical telecommunications network (ATN) mandates, in coming years, it may become mandatory for all commercial aircraft to have a Protected Mode-Controller Pilot Data Link Communications (PM-CPDLC) datalink capability. In order to support these future mandates, the number of Air Traffic Control (ATC) centers or Air Traffic Service Units (ATSU) that are upgraded to support ATN will increase. As an ATC center or ATSU upgrades to an ATN capable center, or if the address changes for the ATN center, the database on an aircraft becomes outdated and the database needs to be updated to enable aircraft communications with the upgraded ATN ATC center. However, updating the database on all aircraft in a fleet of aircraft is a large effort, especially as more and more ATC centers upgrade to ATN centers or as the addresses for the ATN centers change.

An avionics host system, such as a Communication Management Unit (CMU), which is also known as a Communication Management Function (CMF), or a Flight Management Computer (FMC), also known as a Flight Management System (FMS) or Flight Management Function (FMF), hosts the PM-CPDLC application that uses the ATN center information present in an ATC database (residing in the CMU or FMC) to establish a PM-CPDLC connection. Currently, there is no industry defined format for the ATC database, and every avionics manufacturer has their own format and release of the ATC database for original equipment manufacturers (OEMs) or airlines. This practice is expensive as it requires all avionics manufacturers to maintain an additional software (or database).

SUMMARY

A system for aircraft communications comprises an avionics processing unit onboard an aircraft, and a computing platform onboard the aircraft and in operative communication with the avionics processing unit. The computing platform hosts at least one application and one or more aircraft navigational charts with Air Traffic Control (ATC) center identifying information. An aircraft data network is also in operative communication with the computing platform. The avionics processing unit is operative to receive an ATC center facility designator input by a user or from another onboard avionics system, and to transmit the ATC center facility designator to the computing platform. The application is operative to query the aircraft navigational charts based on the ATC center facility designator to obtain corresponding ATC center identifying information, and to send the corresponding ATC center identifying information to the avionics processing unit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
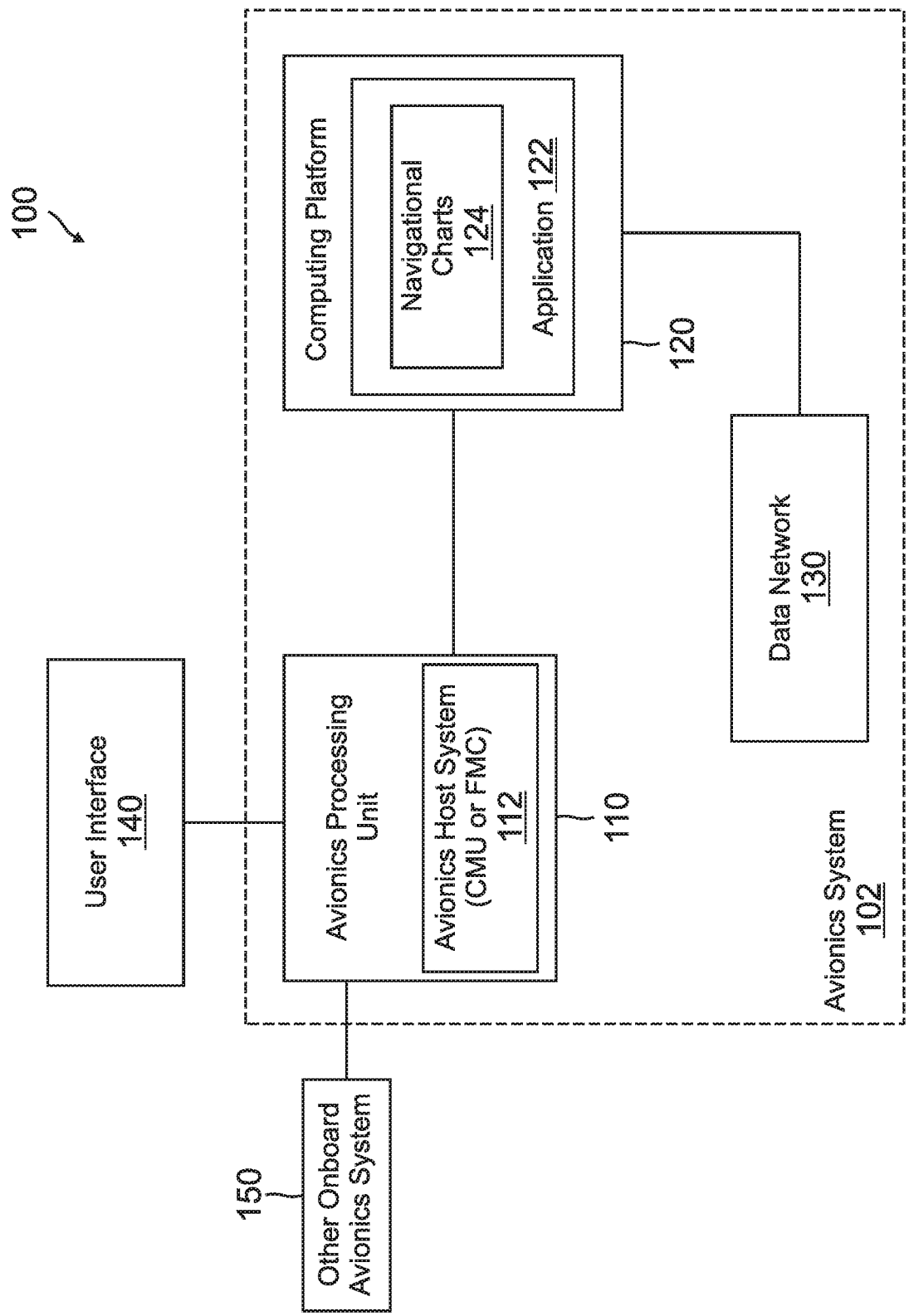
FIG. 1 a block diagram of an avionics system for aircraft communications, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for aircraft communications is provided, in which aeronautical telecommunications network (ATN) center information is fetched from aircraft navigational charts that are included in an avionics system. The ATN center information is then used to establish communications with the ground, such as Protected Mode-Controller Pilot Data Link Communications (PM-CPDLC) connections.

The present system can be generally implemented with an avionics processing unit and a computing platform onboard the aircraft. The computing platform hosts at least one application and one or more aircraft navigational charts with Air Traffic Control (ATC) center identifying information. In addition, the computing platform can host various software applications, manuals such as aircraft operating and flight-crew operating manuals, and one or more databases. The navigational charts, such as sectional or digital charts, can include moving maps for air and ground operations. The computing platform can also have access to information from other aircraft systems, and information from various other ground-based systems.

In one example embodiment, the computing platform can be implemented with an electronic flight bag (EFB). In another example embodiment, the computing platform can implemented with an onboard server.

The avionics processing unit is operative to receive an ATC center facility designator, input by a user or from another onboard avionics system, and to transmit the ATC center facility designator to the computing platform. The computing platform is operative to query the navigational charts based on the ATC center facility designator to obtain corresponding ATC center identifying information, which is sent back to the avionics processing unit for use in establishing a communications connection of the aircraft with the ATC center or an Air Traffic Service Unit (ATSU).

The present system can be implemented by periodically updating the navigational charts to contain the current ATN center information (i.e., designation, center name, AFI, IDI, VER, ADM, RDF, ARS, LOC SYS NSEL, TSEL). In one implementation, the avionics processing unit is configured to request the computing platform for the ATN center information for the corresponding 4 character or 8 character International Civil Aviation Organization (ICAO) facility designation.

The present approach is intended to solve the problem of every avionics manufacturer maintaining their own copy of the ATC database and making frequent releases. By incorporating the ATC center information as part of the navigation charts present in the computing platform, such an EFB, and having the avionics processing unit access the navigational charts to obtain the ATC center information, it will no longer be necessary to maintain additional software (or database) for ATC center information. At the same time, whenever there is an update to an ATC center or Flight Information Region (FIR), a navigational charts release would be able to absorb the changes, thereby keeping the ATC center information current.

Technical benefits of having the ATN center information on the computing platform include lower maintenance costs by eliminating the additional software (or database) for ATC center information, eliminating frequent updates, eliminating delay of upgrade, and reducing workload of maintenance engineers in having to perform the updates.

Further, by storing ATN center information in the computing platform, updates can be easily pushed to the aircraft remotely, without the need for a maintenance engineer to perform the updates. This would result in providing quicker updates of ATN center information, and reduced maintenance costs. Also by standardizing the format of ATN center information and the interface to access the information from the computing platform, multiple avionics manufacturers can be benefited without the need of maintaining individual copies of an ATC database.

Further details of the present system and method are described hereafter with reference to the drawings.

FIG. 1 illustrates a system 100 for aircraft communications, according to one embodiment. The system 100 generally includes an avionics system 102 that includes an avionics processing unit 110 onboard an aircraft, and at least one computing platform 120 in operative communication with avionics processing unit 110. The avionics system 102 also includes an aircraft data network comprising a data network 130 that operatively communicates with computing platform 120. The avionics processing unit 110 is operative to receive an input from a user interface 140 or from at least one other onboard avionics system 150.

The avionics processing unit 110 includes an avionics host system 112, which can be a Communications Management Unit (CMU), also called a Communications Management Function (CMF), or a Flight Management Computer (FMC), also called Flight Management System (FMS) or a Flight Management Function (FMF). The computing platform 120 hosts at least one application 122, and one or more aircraft navigational charts 124 with ATC center identifying information.

Figure 2:
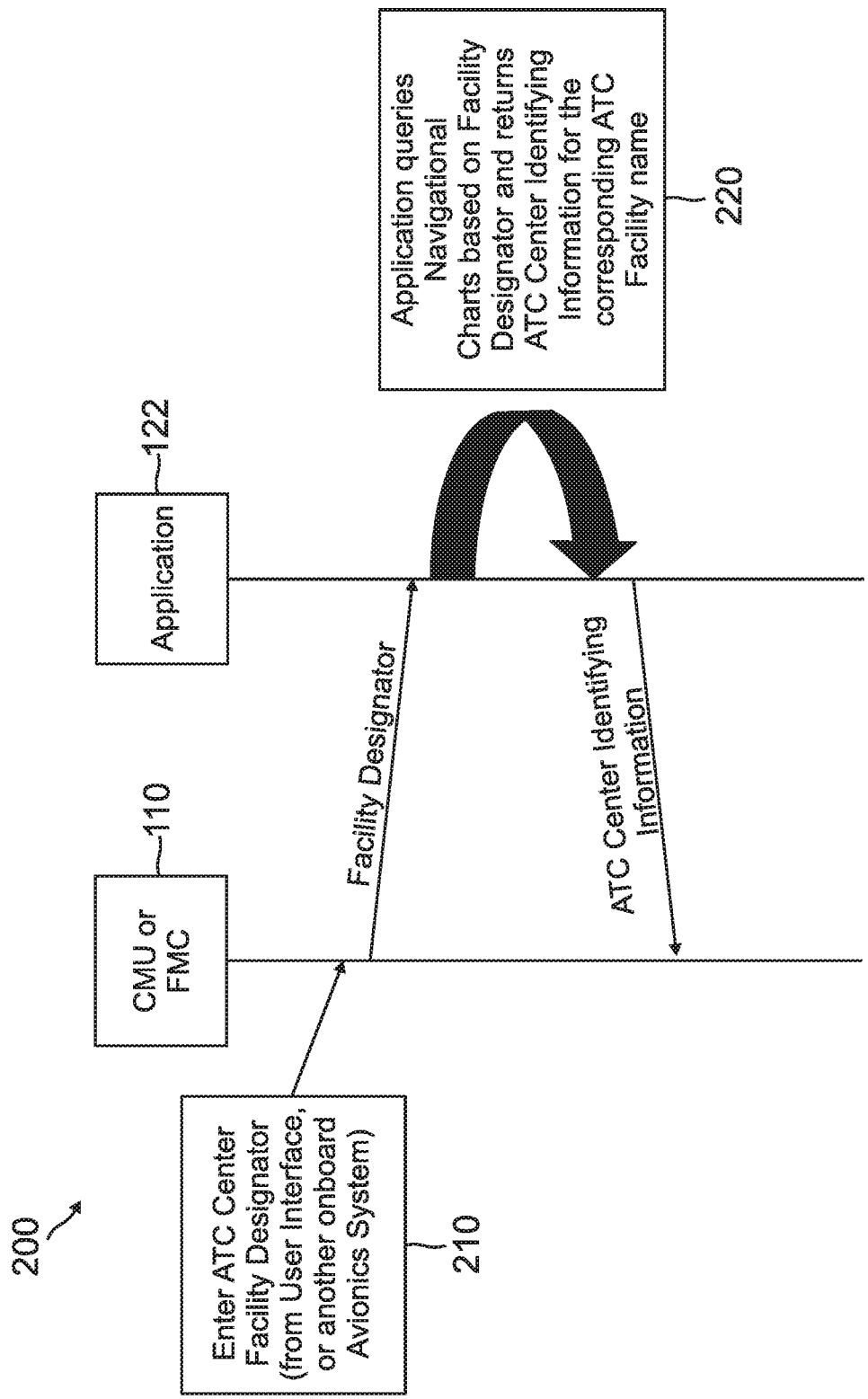
FIG. 2 is a sequence diagram for a method of aircraft communications using the avionics system of FIG. 1.

FIG. 2 depicts an operational sequence 200 for implementing the present method in system 100. Initially, an ATC center facility designator is entered (block 210) into avionics processing unit 110 (CMU or FMC), such as from a user interface or another onboard avionics system. The facility designator is then transmitted to the computing platform that hosts application 122. The application queries the navigational charts based on the facility designator, and returns ATC center identifying information for the corresponding ATC facility name (block 220). The ATC center identifying information is then sent back to avionics processing unit 110, for use in establishing a communications connection with the identified ATC center.

Figure 3:
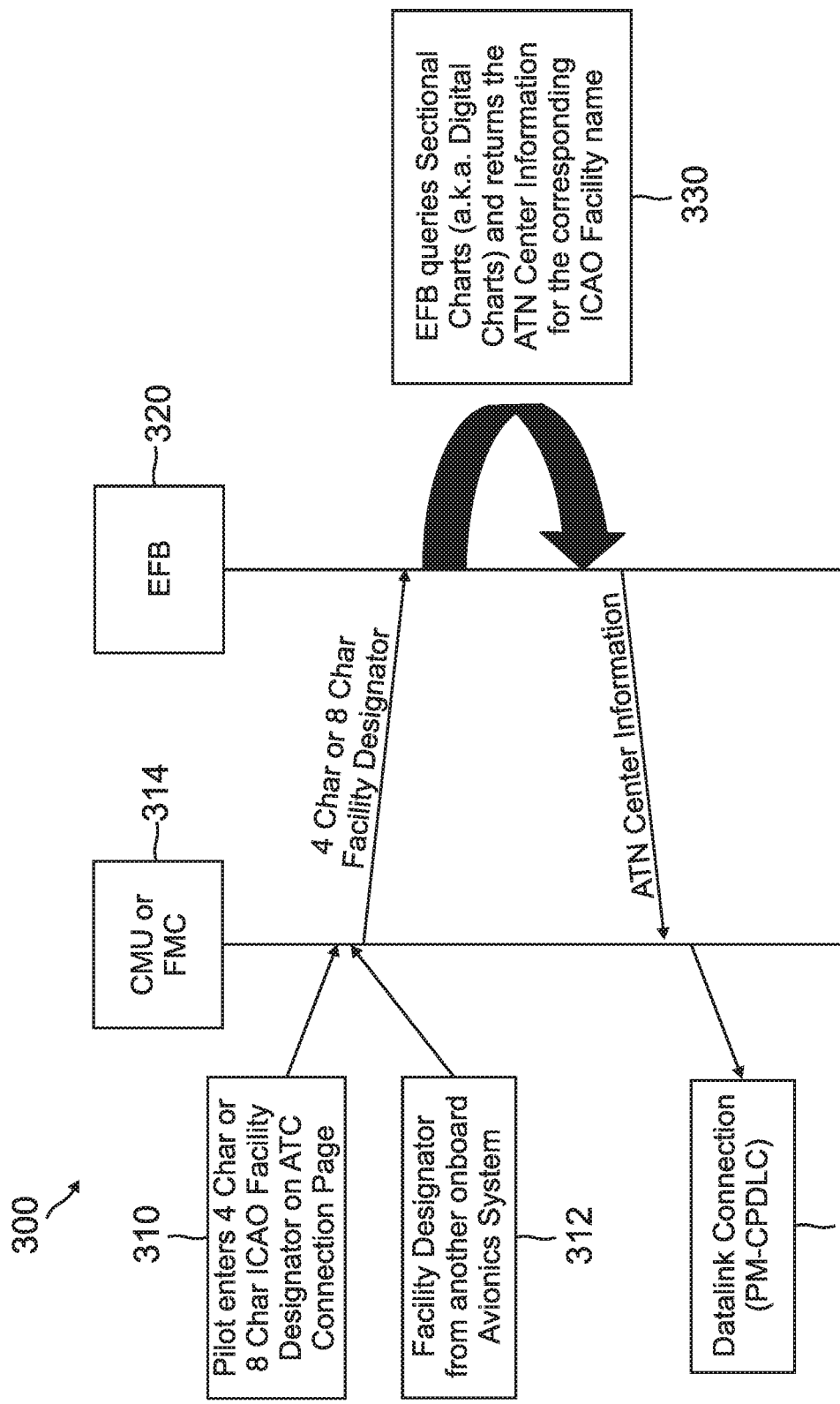
FIG. 3 is a sequence diagram for a method of aircraft communications according to an exemplary implementation.

FIG. 3 illustrates an exemplary operational sequence 300 for implementing the present method using a computing platform implemented as an EFB. Initially, a user such as a pilot enters the four character or eight character ICAO facility designator on an ATC connection page of a user interface (block 310) for a CMU or FMC (block 314). Alternatively, the facility designator information can be sent from another onboard avionics system (block 312) to the CMU or FMC (block 314). The four character or eight character facility designator is then sent to an EFB (block 320). An application in the EFB queries navigational charts (e.g., sectional or digital charts) based on the facility designator, and returns ATN center identifying information for the corresponding ICAO facility name (block 330). The ATN center identifying information is then sent back to the CMU or FMC, for use in establishing a datalink connection such as a PM-CPDLC connection (block 340) with the identified ATN center.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for aircraft communications, the system comprising: an avionics processing unit onboard an aircraft; a computing platform onboard the aircraft and in operative communication with the avionics processing unit, the computing platform hosting at least one application and one or more aircraft navigational charts with Air Traffic Control (ATC) center identifying information; and an aircraft data network in operative communication with the computing platform. The avionics processing unit is operative to receive an ATC center facility designator input by a user or from another onboard avionics system; and transmit the ATC center facility designator to the computing platform. The at least one application is operative to query the one or more aircraft navigational charts based on the ATC center facility designator to obtain corresponding ATC center identifying information; and send the corresponding ATC center identifying information to the avionics processing unit.

Example 2 includes the avionics system of Example 1, wherein the avionics processing unit comprises a communications management unit (CMU), a communications management function (CMF), a flight management computer (FMC), a flight management system (FMS), or a flight management function (FMF).

Example 3 includes the avionics system of any of Examples 1-2, wherein the computing platform comprises an electronic flight bag (EFB), or an onboard server.

Example 4 includes the avionics system of any of Examples 1-3, wherein the one or more aircraft navigational charts comprise sectional charts or digital charts.

Example 5 includes the avionics system of any of Examples 1-4, wherein the avionics processing unit is operatively connected to a user interface.

Example 6 includes the avionics system of any of Examples 1-5, wherein the ATC center facility designator comprises an aeronautical telecommunications network (ATN) center facility designator, and the ATC center identifying information comprises ATN center information.

Example 7 includes the avionics system of any of Examples 1-6, wherein the ATC center facility designator comprises a four character or eight character International Civil Aviation Organization (ICAO) facility designation.

Example 8 includes the avionics system of any of Examples 1-7, wherein the ATC center identifying information is used by the avionics processing unit to establish a protected mode-controller pilot data link communications (PM-CPDLC) connection.

Example 9 includes a method for aircraft communications, the method comprising: entering an ATC center facility designator into an avionics processing unit onboard an aircraft; transmitting the ATC center facility designator from the avionics processing unit to a computing platform onboard the aircraft, the computing platform hosting at least one application and one or more aircraft navigational charts with ATC center identifying information; querying the navigational charts with the at least one application to obtain ATC center identifying information for a corresponding ATC center name based on the ATC facility designator; and transmitting the ATC center identifying information from the computing platform to the avionics processing unit.

Example 10 includes the method of Example 9, further comprising establishing a communications connection with an ATC center or air traffic service unit (ATSU) corresponding to the ATC center identifying information.

Example 11 includes the method of Example 10, wherein the communications connection comprises a PM-CPDLC connection.

Example 12 includes the method of any of Examples 9-11, wherein the one or more aircraft navigational charts comprise sectional charts or digital charts.

Example 13 includes the method of any of Examples 9-12, wherein the ATC center facility designator comprises an ATN center facility designator, and the ATC center identifying information comprises ATN center information.

Example 14 includes the method of any of Examples 9-13, wherein the ATC center facility designator comprises a four character or eight character ICAO facility designation.

Example 15 includes the method of any of Examples 9-14, wherein the computing platform comprises an EFB, or an onboard server.

Example 16 includes a computer program product comprising a non-transitory computer readable medium having instructions stored thereon executable by a processor to perform a method for aircraft communications, the method comprising: entering an ATC center facility designator into an avionics processing unit onboard an aircraft; transmitting the ATC center facility designator from the avionics processing unit to a computing platform onboard the aircraft, the computing platform hosting at least one application and one or more aircraft navigational charts with ATC center identifying information; querying the navigational charts with the at least one application to obtain ATC center identifying information for a corresponding ATC center name based on the ATC facility designator; and transmitting the ATC center identifying information from the computing platform to the avionics processing unit.

Example 17 includes the computer program product of Example 16, wherein the method further comprises: establishing a communications connection with an ATC center or ATSU corresponding to the ATC center identifying information.

Example 18 includes the computer program product of Example 17, wherein the communications connection comprises a PM-CPDLC connection.

Example 19 includes the computer program product of any of Examples 16-18, wherein the ATC center facility designator comprises an ATN center facility designator, and the ATC center identifying information comprises ATN center information.

Example 20 includes the computer program product of any of Examples 16-19, wherein the ATC center facility designator comprises a four character or eight character ICAO facility designation.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for aircraft communications, the system comprising:
    an avionics processing unit onboard an aircraft;
    a computing platform onboard the aircraft and in operative communication with the avionics processing unit, the computing platform hosting at least one application and one or more aircraft navigational charts with Air Traffic Control (ATC) center identifying information; and
    an aircraft data network in operative communication with the computing platform;
    wherein the avionics processing unit is operative to:
        receive an ATC center facility designator input by a user or from another onboard avionics system; and
        transmit the ATC center facility designator to the computing platform;
    wherein the at least one application is operative to:
        query the one or more aircraft navigational charts based on the ATC center facility designator;
        automatically fetch corresponding ATC center identifying information, based on the query, from the one or more aircraft navigational charts; and
        send the corresponding ATC center identifying information to the avionics processing unit.

2. The avionics system of claim 1, wherein the avionics processing unit comprises a communications management unit (CMU), a communications management function (CMF), a flight management computer (FMC), a flight management system (FMS), or a flight management function (FMF).

3. The avionics system of claim 1, wherein the computing platform comprises an electronic flight bag (EFB), or an onboard server.

4. The avionics system of claim 1, wherein the one or more aircraft navigational charts comprise sectional charts or digital charts.

5. The avionics system of claim 1, wherein the avionics processing unit is operatively connected to a user interface.

6. The avionics system of claim 1, wherein the ATC center facility designator comprises an aeronautical telecommunications network (ATN) center facility designator, and the ATC center identifying information comprises ATN center information.

7. The avionics system of claim 1, wherein the ATC center facility designator comprises a four character or eight character International Civil Aviation Organization (ICAO) facility designation.

8. The avionics system of claim 1, wherein the ATC center identifying information is used by the avionics processing unit to establish a protected mode-controller pilot data link communications (PM-CPDLC) connection.

9. A method for aircraft communications, the method comprising:
   entering an air traffic control (ATC) center facility designator into an avionics processing unit onboard an aircraft;
   transmitting the ATC center facility designator from the avionics processing unit to a computing platform onboard the aircraft, the computing platform hosting at least one application and one or more aircraft navigational charts with ATC center identifying information;
   querying the navigational charts with the at least one application based on the ATC facility designator;
   automatically fetching the ATC center identifying information for a corresponding ATC center name from the navigational charts; and
   transmitting the ATC center identifying information from the computing platform to the avionics processing unit.

10. The method of claim 9, further comprising:
    establishing a communications connection with an ATC center or air traffic service unit (ATSU) corresponding to the ATC center identifying information.

11. The method of claim 10, wherein the communications connection comprises a protected mode-controller pilot data link communications (PM-CPDLC) connection.

12. The method of claim 9, wherein the one or more aircraft navigational charts comprise sectional charts or digital charts.

13. The method of claim 9, wherein the ATC center facility designator comprises an aeronautical telecommunications network (ATN) center facility designator, and the ATC center identifying information comprises ATN center information.

14. The method of claim 9, wherein the ATC center facility designator comprises a four character or eight character International Civil Aviation Organization (ICAO) facility designation.

15. The method of claim 9, wherein the computing platform comprises an electronic flight bag (EFB), or an onboard server.

16. A computer program product comprising:
    a non-transitory computer readable medium having instructions stored thereon executable by a processor to perform a method for aircraft communications, the method comprising:
      entering an air traffic control (ATC) center facility designator into an avionics processing unit onboard an aircraft;
      transmitting the ATC center facility designator from the avionics processing unit to a computing platform onboard the aircraft, the computing platform hosting at least one application and one or more aircraft navigational charts with ATC center identifying information;
      querying the navigational charts with the at least one application based on the ATC facility designator;
      automatically fetching the ATC center identifying information for a corresponding ATC center name from the navigational charts; and
      transmitting the ATC center identifying information from the computing platform to the avionics processing unit.

17. The computer program product of claim 16, wherein the method further comprises:
    establishing a communications connection with an ATC center or air traffic service unit (ATSU) corresponding to the ATC center identifying information.

18. The computer program product of claim 17, wherein the communications connection comprises a protected mode-controller pilot data link communications (PM-CPDLC) connection.

19. The computer program product of claim 16, wherein the ATC center facility designator comprises an aeronautical telecommunications network (ATN) center facility designator, and the ATC center identifying information comprises ATN center information.

20. The computer program product of claim 16, wherein the ATC center facility designator comprises a four character or eight character International Civil Aviation Organization (ICAO) facility designation.

* * * * *